US006256835B1

United States Patent
Wang

(10) Patent No.: US 6,256,835 B1
(45) Date of Patent: Jul. 10, 2001

(54) CASTER WITH A LOCKING MECHANISM

(75) Inventor: Paul C.S. Wang, Taipei Hsien (TW)

(73) Assignee: Taiwan Golden Ball Industrial Co., Ltd., Taipei Hsien (TW)

( * ) Notice: Subject to any disclaimer, the term of this patent is extended or adjusted under 35 U.S.C. 154(b) by 0 days.

(21) Appl. No.: 09/453,269

(22) Filed: Dec. 2, 1999

(51) Int. Cl.$^7$ ................................................. B60B 33/00
(52) U.S. Cl. ............................................ 16/35 R; 16/35 D
(58) Field of Search .................................. 16/35 R, 35 D

(56) References Cited

U.S. PATENT DOCUMENTS

| | | | |
|---|---|---|---|
| 3,735,838 | * 5/1973 | Greenleaf | 182/15 |
| 4,821,369 | * 4/1989 | Daniels | 16/35 R |
| 5,133,106 | * 7/1992 | Milbredt et al. | 16/35 R |
| 5,232,071 | * 8/1993 | Kawannabe | 188/1.12 |
| 5,355,550 | * 10/1994 | Yang | 16/44 |
| 5,537,715 | * 7/1996 | Yang | 16/35 R |
| 5,617,934 | * 4/1997 | Yang | 188/1.12 |
| 5,632,360 | * 5/1997 | Melera | 188/1.12 |

* cited by examiner

Primary Examiner—Lynne H. Browne
Assistant Examiner—John B. Walsh
(74) Attorney, Agent, or Firm—Pitney, Hardin, Kipp & Szuch LLP

(57) ABSTRACT

A caster includes a wheel body having a hub portion and an axle extending from the hub portion. Lock engaging members are disposed around the hub portion. An upright mounting frame includes a lower mounting portion journalled to the axle, and an upper mounting portion extending upwardly from the lower mounting portion. The upper mounting portion is spaced apart from the wheel body to define an upright passage therebetween. A support frame is movable relative to the mounting frame, and includes an upper force transmitting member to support a load. A confining member extends downward from the upper force transmitting member into the upright passage, and has an outer wall facing the wheel body. A spring member biases the upper force transmitting member to move upwardly and away from the mounting frame. The lock member is disposed on the outer wall and faces towards the lock engaging members such that when the upper force transmitting member is under load, the confining member will move downwardly to bring the lock member to engage one of the lock engaging members against the biasing action of the spring member, thereby braking the wheel body from rotation.

3 Claims, 6 Drawing Sheets

CASTER WITH A LOCKING MECHANISM

BACKGROUND OF THE INVENTION

1. Field of the Invention

This invention relates to a caster, more particularly to a caster with a locking mechanism.

2. Description of the Related Art

Referring to FIGS. 1 and 2, a conventional caster 1 is shown to comprise a wheel support 10 and two wheels 11 mounted rotatably on the wheel support 10. The wheel support 10 has an arcuate cover member 100, a tubular seat 101 formed on a top face of the cover member 100, a connecting post 12 inserted into the seat 101, and a tubular connecting portion 102 connected to a bottom face of the cover member 100. A wheel axle 13 extends through the connecting portion 102, and is connected to central portions 111 of the wheels 11 at two opposite ends thereof. Although such a conventional caster can be connected to a chair to facilitate movement of the same, it cannot be locked to prevent undesirable movement of the chair.

SUMMARY OF THE INVENTION

The object of the present invention is to provide a caster that can be locked to prevent undesired movement of a load disposed thereon.

According to the present invention, a caster comprises a wheel body, an axle, a plurality of lock engaging members, a mounting frame, a support frame, a spring member, and a lock member. The wheel body includes a hub portion defining a rotating axis, and a rim portion spaced apart from the hub portion radially and peripherally so as to define an annular accommodation area therebetween. The axle is disposed on and extends from the hub portion along the rotating axis, and has right and left ends respectively proximate and distal to the hub portion, and an intermediate portion interposed between the right and left ends. The lock engaging members are angularly spaced from each other and are disposed on the hub portion around the rotating axis. The mounting frame is disposed in an upright position, and includes a lower mounting portion to journal the intermediate portion so as to permit the axle to rotate relative thereto about the rotating axis, and an upper mounting portion disposed to extend from the lower mounting portion uprightly and in a direction transverse to the rotating axis. The upper mounting portion is spaced apart from the annular accommodation area in a longitudinal direction parallel to the rotating axis so as to define an upright passage therebetween. The support frame is disposed to be movable relative to the mounting frame in the transverse direction. The support frame includes an upper force transmitting member adapted to be swiveled around an axis parallel to the transverse direction and to support a load so that a downward pressure stemming from the load will move the upper force transmitting member downward and towards the mounting frame. The support frame further includes a confining member disposed to extend downward from the upper force transmitting member into the upright passage. The confining member has an inner wall to confine the mounting frame in the upright position, and an outer wall opposite to the inner wall in the longitudinal direction. The outer wall faces the accommodation area. The spring member biases the upper force transmitting member to move upwardly and away from the mounting frame in the transverse direction. The lock member is disposed on the outer wall and extends into the accommodation area so as to face towards the lock engaging members in the transverse direction such that when the upper force transmitting member is under load, the downward movement of the confining member will bring the lock member to engage one of the lock engaging members against the biasing action of the spring member, thereby braking the wheel body from rotation.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
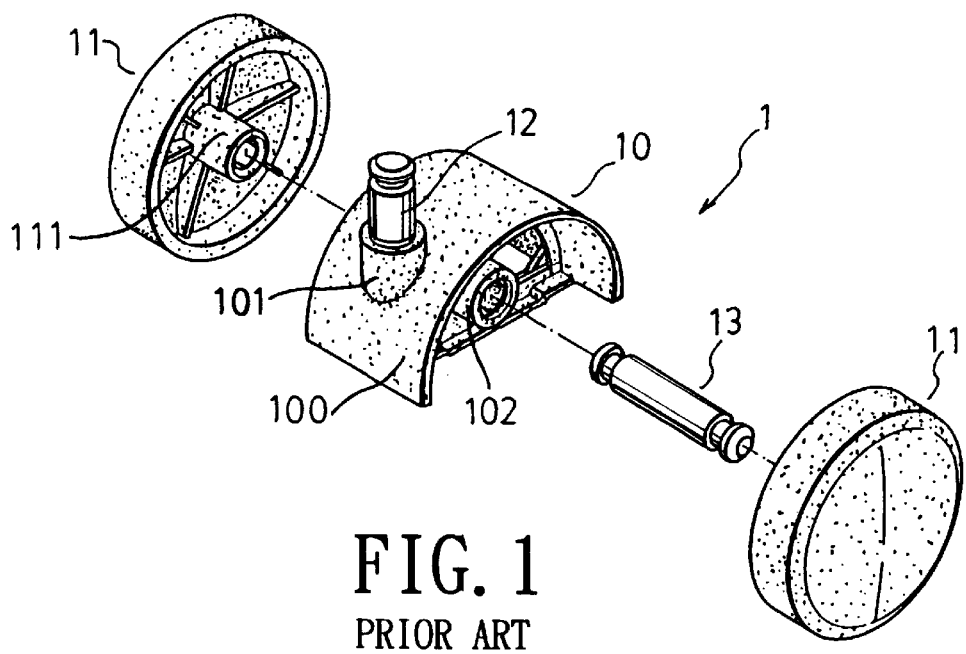
FIG. 1 is an exploded view of a conventional caster.
Figure 2:
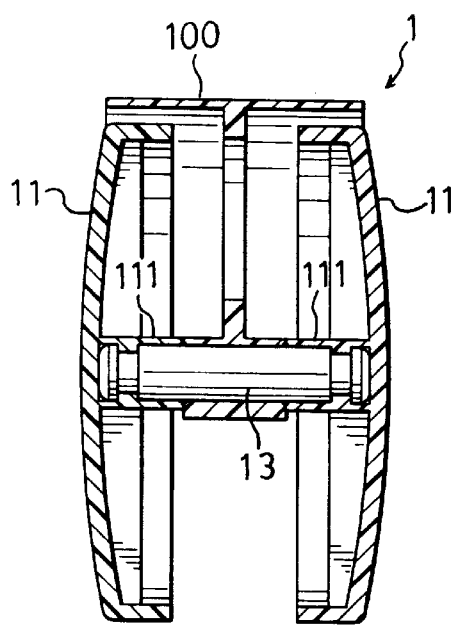
FIG. 2 is a cross-sectional view of the conventional caster of FIG. 1.

Before the present invention is disclosed in greater detail, it should be noted that like elements are denoted by the same reference numerals throughout the disclosure.

Figure 3:
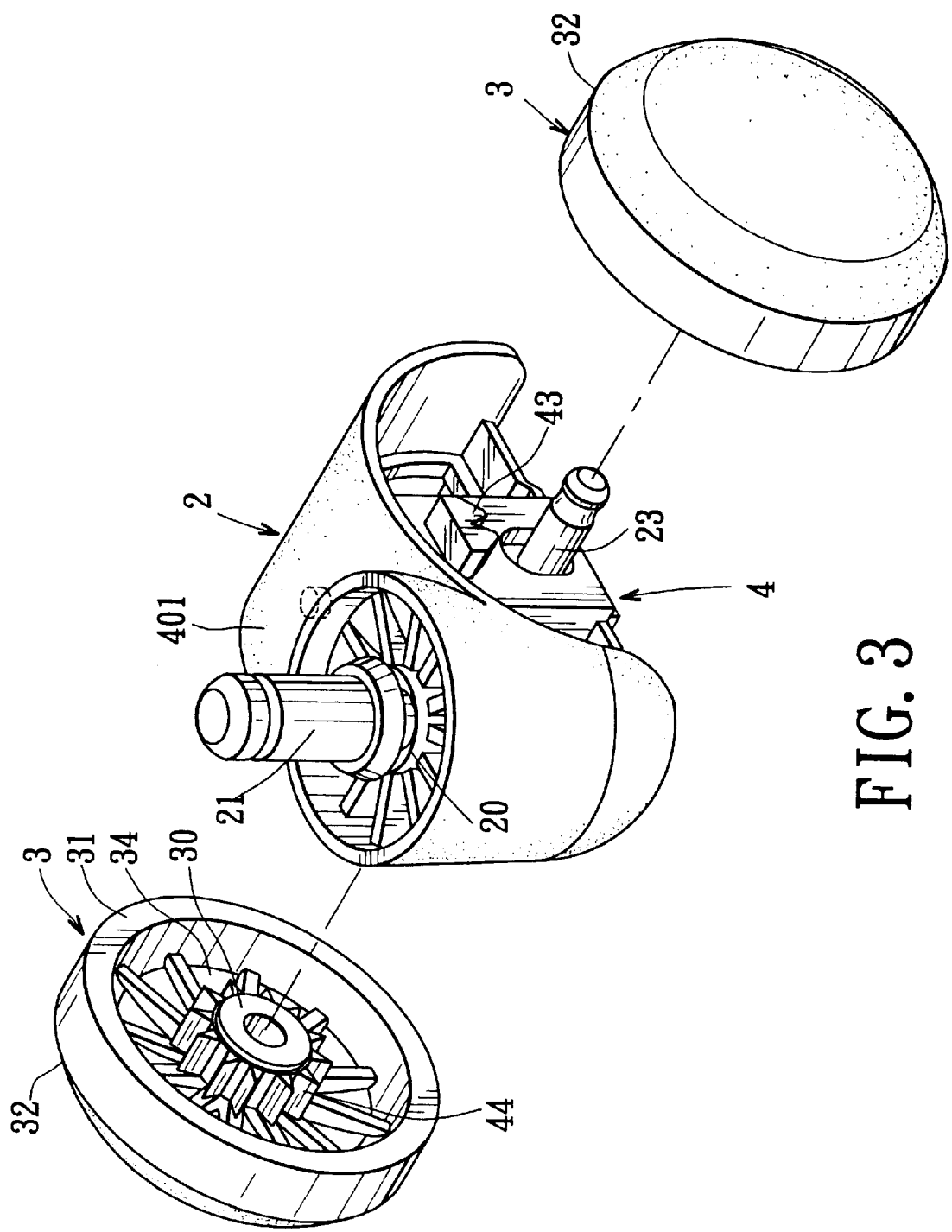
FIG. 3 is an exploded perspective view of a first preferred embodiment of a caster according to the present invention.

Referring to FIG. 3, a first preferred embodiment of a caster according to the present invention is shown to comprise a wheel support 2, two wheel bodies 3 mounted rotatably on the wheel support 2, and a locking mechanism 4 disposed between the wheel support 2 and the wheel bodies 3.

Figure 5:
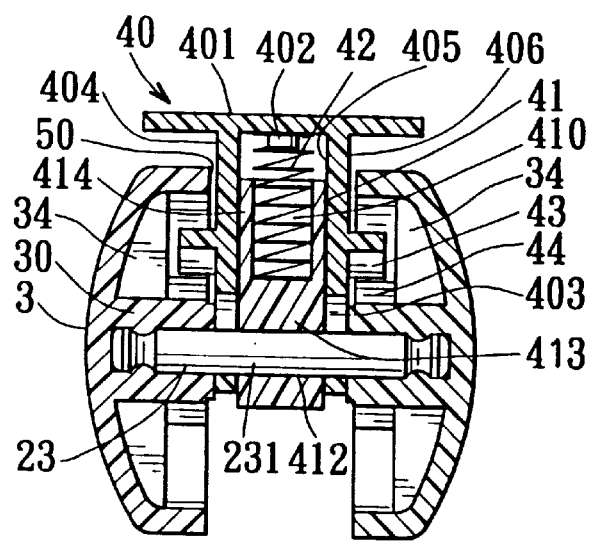
FIG. 5 is a cross-sectional view of the first preferred embodiment of the caster according to the present invention, in which the caster is in an unlocked position.

Referring to FIGS. 3 and 5, the wheel support 2 has a mounting hole 20, and an upright rotary shaft 21 is connected pivotally to the mounting hole 20. The rotary shaft 21 has an upper end adapted for connection to a seat member (not shown). An axle 23 is disposed to extend along a rotating axis of the wheel bodies 3. Each of the wheel bodies 3 includes a hub portion 30 defining the rotating axis, a rim portion 32 spaced apart from the hub portion 30 radially and peripherally so as to define an annular accommodation area 34 therebetween, and an annular flange 31 extending axially from the rim portion 32. The axle 23 has right and left ends connected respectively to the hub portions 30, and an intermediate portion 231 interposed between the right and left ends.

Figure 4:
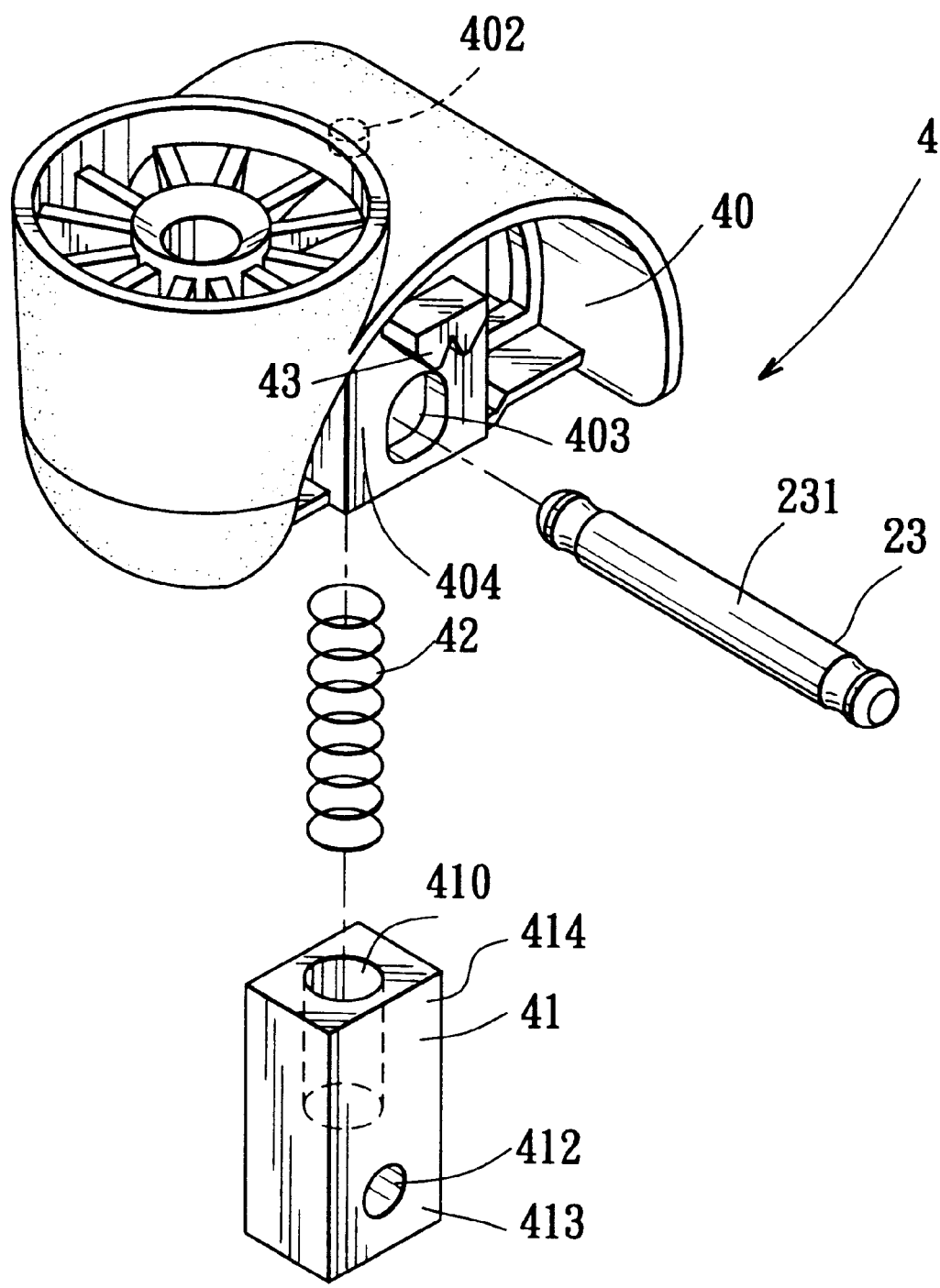
FIG. 4 is an exploded perspective view of a locking mechanism of the caster of the first preferred embodiment according to the present invention.
Figure 6:
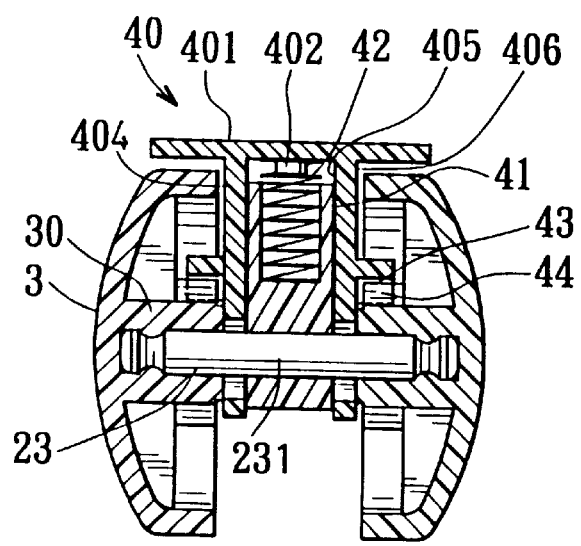
FIG. 6 is a cross-sectional view of the first preferred embodiment of the caster according to the present invention, in which the caster is in a locked position.

Referring to FIGS. 4 and 5, the locking mechanism 4 includes a support frame 40, a mounting frame 41, a spring member 42 disposed between the support frame 40 and the mounting frame 41, a lock member 43, and a plurality of lock engaging members 44. The lock engaging members 44 are in the form of teeth that are angularly spaced from each other and that are disposed on each of the hub portions 30 around the rotating axis. The mounting frame 41 is disposed in an upright position, and includes a lower mounting portion 413 that is formed with a through hole 412 to journal the intermediate portion 231. As such, the axle 23 can rotate relative to the mounting frame 41 about the rotating axis. The mounting frame 41 further has an upper mounting portion 414 disposed to extend from the lower mounting portion 413 uprightly and in a direction transverse to the rotating axis. The upper mounting portion 414 is spaced apart from the annular accommodation area 34 of each of the wheel bodies 3 in a longitudinal direction parallel to the rotating axis so as to define an upright passage 50 therebetween. The support frame 40 is disposed to be movable relative to the mounting frame 41 in the transverse direction. The support frame 40 includes an upper force transmitting member 401 that is formed as a downwardly curved cover and that is adapted to be swiveled around an axis of the rotary shaft 21 which is parallel to the transverse direction. The support frame 40 further includes a tubular confining member 404 disposed to extend downward from the upper force transmitting member 401 into the upright passage 50. The confining member 404 has an inner wall 405 to confine the mounting frame 41 in the upright position, an outer wall 406 opposite to the inner wall 405 in the longitudinal direction, and a slot 403 formed through the inner and outer walls 405, 406 adjacent to a distal end thereof. The slot 403 is elongated in the transverse direction and has the axle 23 extending therethrough. The outer wall 406 faces the accommodation areas 34 of the wheel bodies 3. A spring member 42 is disposed between the upper force transmitting member 401 and the upper mounting portion 414 of the mounting frame 41 and biases the upper force transmitting member 401 to move upwardly and away from the mounting frame 41 in the transverse direction. The spring member 42 has an upper end that is connected to a projection 402 formed on a lower face of the upper force transmitting member 401, and a lower end that is received in a counter bore 410 formed in the upper mounting portion 414 of the mounting frame 41. The upper force transmitting member 401 supports a load exerted on the seat member (not shown), so that a downward pressure stemming from the load will move the upper force transmitting member 401 downward and towards the mounting frame 41, as best illustrated in FIG. 6. The lock member 43 includes two teeth members that are disposed oppositely on the outer wall 406 and that extend respectively into the accommodation areas 34 of the wheel bodies 3 so as to face towards the lock engaging members 44 in the transverse direction. As such, when the upper force transmitting member 401 is under load, the downward movement of the confining member 404 which is against the biasing action of the spring member 42 will bring the lock member 43 to engage one of the lock engaging members 44, thereby braking the wheel bodies 3 from rotation. In this way, when a person sits on the seat is member to exert a load on the upper force transmitting member 401, the wheel bodies 3 are locked to prevent undesired movement of the seat member.

Figure 7:
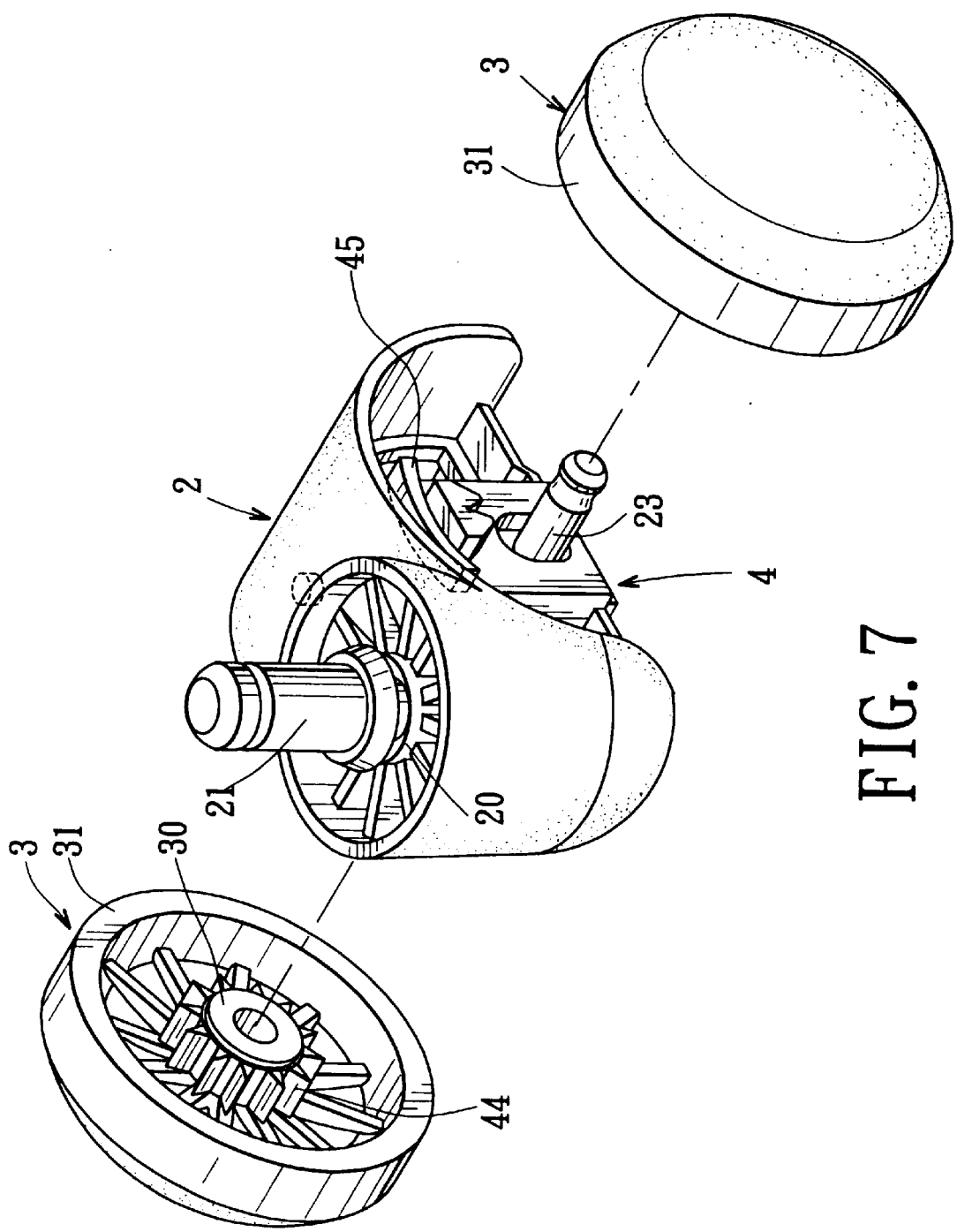
FIG. 7 is an exploded perspective view of a second preferred embodiment of a caster according to the present invention.
Figure 8:
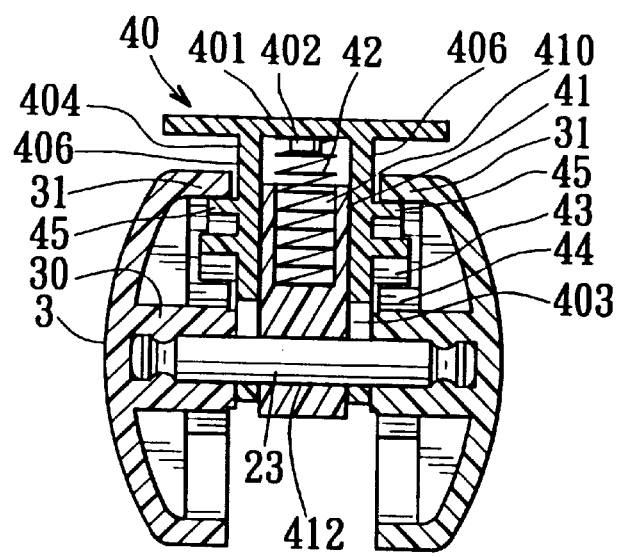
FIG. 8 is a cross-sectional view of the second preferred embodiment of the caster according to the present invention, in which the caster is in an unlocked position.
Figure 9:
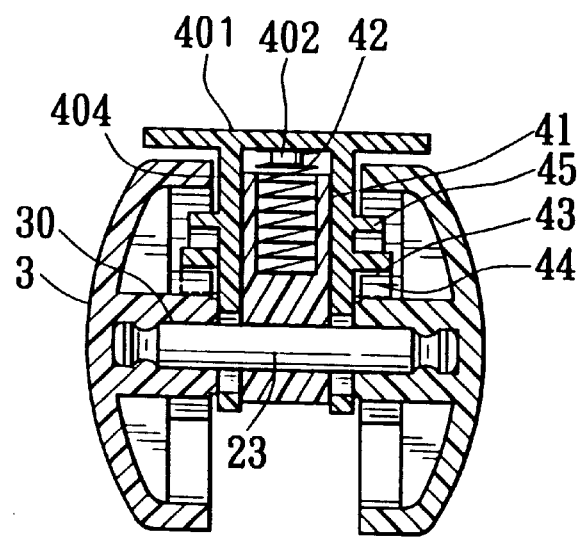
FIG. 9 is a cross-sectional view of the second preferred embodiment of the caster according to the present invention, in which the caster is in a locked position.

Referring to FIGS. 7 and 8, a second preferred embodiment of a caster according to the present invention is shown to comprise a wheel support 2, two wheel bodies 3, and a locking mechanism 4. In this embodiment, the structure of the caster is similar to that of the caster in the first embodiment except that two arcuate friction plates 45 project oppositely from the outer wall 406 of the support frame 40 into the accommodation areas 34 between the lock member 43 and the upper force transmitting member 401. As such, each of the friction plates 45 is brought by the biasing action of the spring member 42 into frictional contact with the annular flanges 31 of the wheel bodies 3, as best illustrated in FIG. 8. In this way, the seat member with the caster can move slowly when the seat member is pushed by the user. When the user sits on the seat member, the lock member 43 and the lock engaging members 44 engage to lock the caster in the aforementioned manner, as best illustrated in FIG. 9.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A caster comprising:

a wheel body including a hub portion defining a rotating axis, and a rim portion spaced apart from said hub portion radially and peripherally so as to define an annular accommodation area therebetween;

an axle disposed on and extending from said hub portion along said rotating axis, said axle having right and left ends respectively proximate and distal to said hub portion, and an intermediate portion interposed between said right and left ends;

a plurality of lock engaging members angularly spaced from each other and disposed on said hub portion around said rotating axis;

a mounting frame disposed in an upright position and including a lower mounting portion to journal said intermediate portion so as to permit said axle to rotate relative thereto about said rotating axis, and an upper mounting portion disposed to extend from said lower mounting portion uprightly and in a direction transverse to said rotating axis and spaced apart from said annular accommodation area in a longitudinal direction parallel to said rotating axis so as to define an upright passage therebetween;

a support frame disposed to be movable relative to said mounting frame in said transverse direction, said support frame including an upper force transmitting member adapted to be swiveled around an axis parallel to said transverse direction and to support a load so that a downward pressure stemming from the load will move said upper force transmitting member downward and towards said mounting frame, and a confining member disposed to extend downward from said upper force transmitting member into said upright passage, said confining member having an inner wall to confine said mounting frame in said upright position, and an outer wall opposite to said inner wall in said longitudinal direction and facing said accommodation area;

a spring member biasing said upper force transmitting member to move upwardly and away from said mounting frame in said transverse direction; and a lock member disposed on said outer wall and extending into said accommodation area so as to face towards said plurality of lock engaging members in said transverse direction such that when said upper force transmitting member is under load, the downward movement of said confining member which is against the biasing action of said spring member will bring said lock member to engage one of said lock engaging members, thereby braking said wheel body from rotation;

wherein said wheel body has an annular flange extending axially from said rim portion toward said confining member, said confining member having a friction plate projecting from said outer wall into said accommodation area and between said lock member and said upper force transmitting member, such that said friction plate is brought by the biasing action of said spring member into frictional contact with said annular flange.

2. The caster as claimed in claim 1, wherein said confining member has a slot formed through said inner and outer walls thereof adjacent to a distal end thereof, said axle extending through said slot of said confining member.

3. A caster comprising:

a wheel body including a hub portion defining a rotating axis, and a rim portion spaced apart from said hub portion radially and peripherally so as to define an annular accommodation area therebetween;

an axle disposed on and extending from said hub portion along said rotating axis, said axle having right and left ends respectively proximate and distal to said hub portion, and an intermediate portion interposed between said right and left ends;

a plurality of lock engaging members angularly spaced from each other and disposed on said hub portion around said rotating axis;

a mounting frame disposed in an upright position and including a lower mounting portion to journal said intermediate portion so as to permit said axle to rotate relative thereto about said rotating axis, and an upper mounting portion disposed to extend from said lower mounting portion uprightly and in a direction transverse to said rotating axis and spaced apart from said annular accommodation area in a longitudinal direction parallel to said rotating axis so as to define an upright passage therebetween;

a support frame disposed to be movable relative to said mounting frame in said transverse direction, said support frame including an upper force transmitting member adapted to be swiveled around an axis parallel to said transverse direction and to support a load so that a downward pressure stemming from the load will move said upper force transmitting member downward and towards said mounting frame, and a confining member disposed to extend downward from said upper force transmitting member into said upright passage, said confining member having an inner wall to confine said mounting frame in said upright position, and an outer wall opposite to said inner wall in said longitudinal direction and facing said accommodation area;

a spring member biasing said upper force transmitting member to move upwardly and away from said mounting frame in said transverse direction; and a lock member disposed on said outer wall and extending into said accommodation area so as to face towards said plurality of lock engaging members in said transverse direction such that when said upper force transmitting member is under load, the downward movement of said confining member which is against the biasing action of said spring member will bring said lock member to engage one of said lock engaging members, thereby braking said wheel body from rotation;

wherein said spring member is disposed between said upper mounting portion of said mounting frame and said upper force transmitting member; and wherein said mounting frame has a counter bore formed in said upper mounting portion thereof to receive a part of said spring member.

* * * * *